United States Patent [19]

Bührer

[11] 3,931,720
[45] Jan. 13, 1976

[54] SELF-ALIGNING COUPLING

[76] Inventor: Rolf Bührer, Seestrasse 192/194, 8810 Horgen (Kt. Zurich), Switzerland

[22] Filed: Dec. 5, 1973

[21] Appl. No.: 422,101

[30] Foreign Application Priority Data

Feb. 7, 1973 Switzerland.................... 1851/73

[52] U.S. Cl. ............................. 64/31; 64/6; 64/16; 279/17
[51] Int. Cl.[2] ......................................... F16D 3/04
[58] Field of Search ............. 64/31, 6, 9 A; 279/16, 279/17, 18

[56] References Cited
UNITED STATES PATENTS

| | | | |
|---|---|---|---|
| 1,027,520 | 5/1912 | Blood..................................... | 64/31 |
| 1,883,611 | 10/1932 | DeVlieg................................ | 279/16 |
| 2,333,611 | 11/1943 | Wolf....................................... | 64/31 |
| 2,932,255 | 4/1960 | Neukirch.............................. | 64/31 |
| 3,454,283 | 7/1969 | Benjamin et al...................... | 64/31 |

*Primary Examiner*—Samuel Scott
*Assistant Examiner*—Randall Heald
*Attorney, Agent, or Firm*—Karl F. Ross; Herbert Dubno

[57] ABSTRACT

A self-aligning coupling between a driving member and a driven member as a cross-disc member in which the members define a pair of linear slots at right angles to one another and have axial faces adjoining the flanks of these slots. The cross-disc member has ledges received in the slots and planar surfaces parallel to the flanks and axial faces, but spaced therefrom. L-section bearing cages with arrays of parallel needle bearings in each leg of the L are provided between the flanks and adjoining faces of one member and the juxtaposed flanks and adjoining faces of the other member so that the roller axes of each cage are orthogonal to one another.

6 Claims, 5 Drawing Figures

SELF-ALIGNING COUPLING

This invention refers to a self-aligning coupling for joining shafts or similar rotating components in parallel alignment, with a driving and a driven part and a cross disk coupling arranged therebetween.

Self-aligning couplings are known, in which the faces of the cross disk and the opposing inner end faces of the driving and driven parts have semicircular grooves radially extending to the axis of rotation, in which balls are provided to act as force transmitting elements between cross disk and driving part on the one hand and between cross disk and driven part on the other hand.

Such self-aligning couplings suffer however from the drawback that the balls impose considerable axial forces on the driving and driven parts. Another disadvantage resides in the point loads imposed by the balls at the contact points, causing correspondingly high specific pressures per unit area. This disadvantage can be met in part by fitting bigger balls, but this adversely affects the overall dimentions of the coupling.

The present invention has for its object to obviate these disadvantages. This is accomplished by providing the cross disk with a driving ledge on each of its faces, these ledges intersecting at right angles in the axial projection and engaging corresponding grooves in the driving and driven parts, laterally limiting surfaces being left between grooves and ledges, as well as spaces between the faces of the cross disk and the opposite end faces of the driving and driven parts. Fitted in said spaces are needle thrust bearings, whose cages consist of lengths of L-profiles with the needles rotatably mounted in their shanks.

The accompanying drawing shows by way of example two forms of embodiment incorporating the invention, and wherein.

Figure 1:
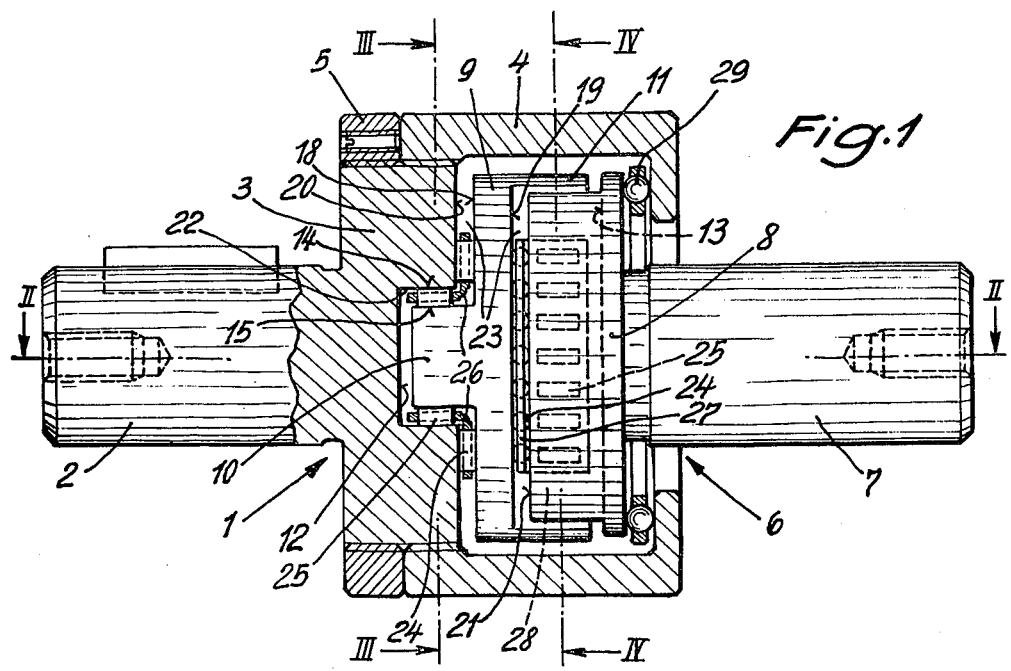
FIG. 1 is an axial section of a self-aligning coupling joining two shafts in parallel alignment with each other.
Figure 2:
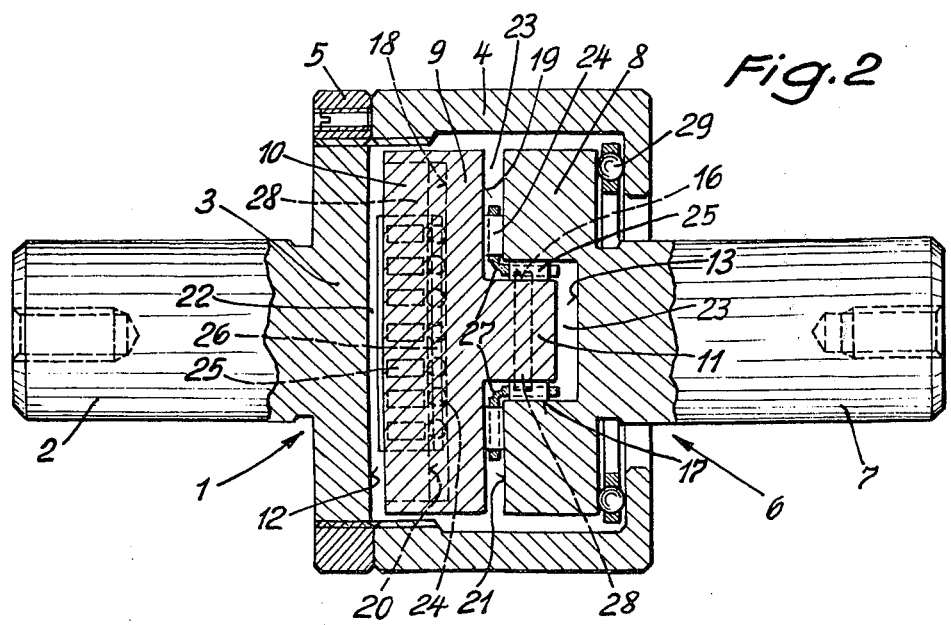
FIG. 2 is another axial section taken along the line II—II of FIG. 1.
Figure 3:
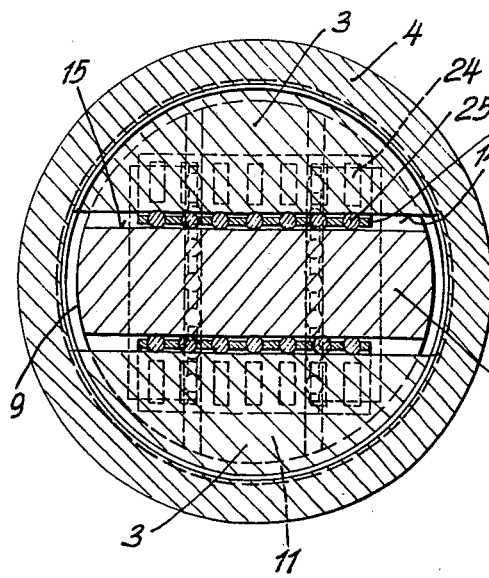
FIG. 3 shows a section view taken along the line III — III of FIG. 1.
Figure 4:
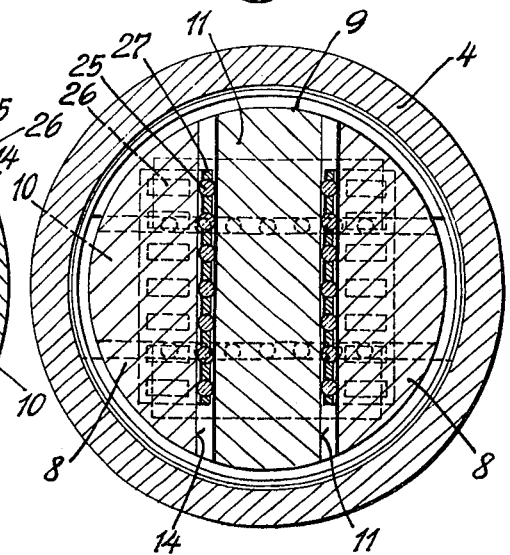
FIG. 4 shows a sectional view taken on the line IV — IV of FIG. 1.

Referring to said drawing, the driving part shown in FIGS. 1 to 4 is denoted by numeral 1, comprising the stub shaft 2 and the disk-shaped coupling head 3 integral therewith. The coupling head, threaded on the outside, has the coupling housing 4 screwed onto it and secured by a lock nut 5.

The driven part 6 comprises the stub shaft 7 and the coupling disk 8 integral therewith. Arranged between the head 3 of the driving part and the coupling disk 8 of the driven part is a cross disk 9. On its two faces the latter has a prismatic ledge 10 and 11 respectively, which cross at right angles in the axial projection and engage corresponding grooves 12 and 13 in coupling head 3 and coupling disk 8.

Between said grooves 12,13 and the surfaces 14,15 and 16,17 defining the ledges 10,11 laterally, and between the faces 18,19 of the cross disk 9 and the opposite faces 20,21 of the driving and driven parts, spaces 22,23 are left having needle thrust bearings 24,25 fitted therein. As cages for the needles use is made of L-profile lengths 26,27, carrying in their shanks the needles, which rotate at right angles to the length of the L-profiles. The needle thrust bearings float so as to be able to shift linearly in the spaces 22,23 at right angles to the needle axes. This displacement of the needle thrust bearings is limited by stops in the form of pins 28 anchored in the driving ledges 10,11. Coupling disk 8 and a shoulder 30 of the housing 4 have a ball thrust bearing 29 arranged therebetween.

In the self-aligning coupling in the form of a drill chuck shown in FIG. 5, numeral 3 again designates the disk-shaped coupling head of the driving part, and 8 the coupling disk of the driven part. The housing 4 has the coupling head 3 bolted thereonto and secured in position by the lock nut 5. The cross disk 9 includes driving ledges 10 and 11 projecting from its two faces and engaging the corresponding grooves 22 and 23 in coupling head 3 and coupling disk 8 through the interposed needle thrust bearings 24,25. Arranged between coupling disk 8 and shoulder 30 of the housing 4 there is again a ball thrust bearing 29.

Instead of the stub shaft 7 as shown in the form according to FIGS. 1 to 4, there is arranged a draw-in collet chuck 31 to take a drilling tool on coupling disk 8 at the driven side.

Figure 5:
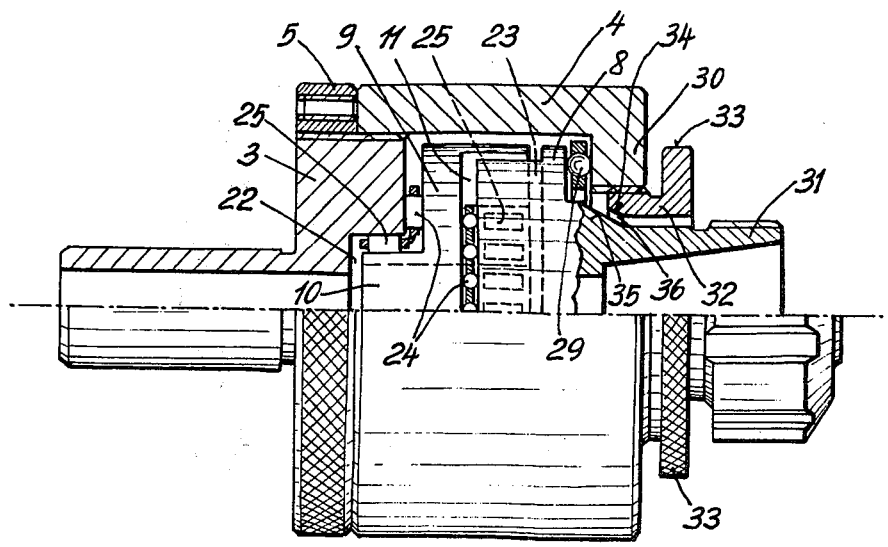
FIG. 5 represents an axial section through a self-aligning coupling in the form of a drill chuck.

In the form shown in FIG. 5, the shoulder 30 has an internal thread, in which a bush 32 can be adjusted by turning. On its outer face said bush has a flange 33 with knurled edge. Towards the inner face of the bush its bore widens conically at 34. At the end of the collet chuck 31 is a corresponding mating taper 35. In the position shown, the two tapers 34 and 35 leave an annular gap 36. Within this annular gap the coupling disk 8 or collet chuck 31 can float, in other words perform axially parallel movements in relation to the driving part. This range of movement may be varied by turning the bush 32 in its threads.

What I claim is:

1. A self-aligning coupling comprising a driving part and a driven part, said parts having grooves oriented at right angles to one another with planar flanks parallel to the axis of the respective part and planar faces perpendicular to said axes;

a cross-disk member received between said parts and having a pair of prismatic ledges oriented at right angles to one another and respectively received in said grooves, said ledges having planar flanks each parallel to and spacedly juxtaposed with a flank of the respective groove, said member having planar faces adjoining said ledges and spacedly juxtaposed with and parallel to a respective face of one of said parts whereby each flank of a groove and an adjoining face of one of said parts is paired with a juxtaposed flank of a respective ledge and an adjoining face of said member;

and a respective bearing element comprising a linearly extending L-profile and linearly movable cage, with legs lying between the paired faces and flanks, disposed between said parts and said members, each of said bearing elements being formed with an array of a multiplicity of thrust needle bearings in each leg engaging the paired surfaces and paired flanks with the axes of the needle bearings of one leg of each element orthogonal to the axes of the needle bearings of the other leg thereof.

2. The coupling defined in claim 1, further comprising stops for limiting the linear displacement of said cages in each direction of movement thereof.

3. The coupling defined in claim 2, wherein said stops are pins mounted in said ledges.

4. The coupling defined in claim 1, further comprising a casing closing said member and threaded onto one of said parts, a lock nut securing said casing on said one of said parts.

5. The coupling defined in claim 1, further comprising a ball thrust bearing supporting one of said parts on the other of said parts.

6. The coupling defined in claim 1 wherein said driven part is formed with a tool chuck.

* * * * *